United States Patent [19]

Winslow

[11] Patent Number: 4,865,333
[45] Date of Patent: Sep. 12, 1989

[54] SEAL PROTECTION APPARATUS

[76] Inventor: Denis M. W. Winslow, P.O. Box 8311, Edenglen, 1610, South Africa

[21] Appl. No.: 111,766

[22] Filed: Oct. 23, 1987

[30] Foreign Application Priority Data

Oct. 23, 1986 [ZA] South Africa ............. 86/8044

[51] Int. Cl.⁴ ............................................. F16J 15/36
[52] U.S. Cl. ............................ 277/28; 277/3; 277/81 R; 277/88
[58] Field of Search ............. 277/3, 28, 27, 81 R, 277/87, 88, 89

[56] References Cited

U.S. PATENT DOCUMENTS

| | | | |
|---|---|---|---|
| 2,423,642 | 7/1947 | Endebak | 277/81 |
| 2,743,121 | 4/1956 | Stevens | 277/3 |
| 2,835,514 | 5/1958 | Mc Gahan | 277/3 |
| 3,026,114 | 3/1962 | Andresen et al. | 277/88 |
| 3,035,841 | 5/1962 | Riester | 277/3 |
| 3,051,497 | 8/1962 | Wigg et al. | 277/3 |
| 3,356,378 | 12/1967 | Tracy | 277/81 R |
| 3,895,813 | 7/1975 | Davies et al. | 277/88 |
| 4,094,512 | 6/1978 | Back | 277/28 |
| 4,150,834 | 4/1979 | Robert | 277/88 |
| 4,174,844 | 11/1979 | Zobens | 277/96.2 |
| 4,219,202 | 8/1980 | Koch | 277/28 |
| 4,257,617 | 3/1981 | Hill | 277/3 |
| 4,538,820 | 9/1985 | Duffee | 277/81 R |

Primary Examiner—Harvey C. Hornsby
Assistant Examiner—Corinne M. Reinckens
Attorney, Agent, or Firm—Burns, Doane, Swecker & Mathis

[57] ABSTRACT

The seal protection apparatus is intended to provide protection for a main mechanical seal. It comprises a first seal ring fast on the shaft of a pump and a second seal ring which is connected to the casing of the pump by means of a flexible, annular diaphragm which is exposed on one side to pumped product in the casing. The combination of seal rings and diaphragm define one end of a service liquid compartment which is supplied with pressurized, clean service water. The other end of the compartment is defined by the main seal. With a flow of service water to the compartment, the seal rings are forced apart by the water pressure. Water is able to leak between the rings into the casing thereby denying the pumped product access to the compartment and main seal. On the other hand, if the supply of service water should fail for any reason, the pumped product acts on the diaphragm and forces the seal rings together. The pumped product is again denied access to the main seal.

4 Claims, 1 Drawing Sheet

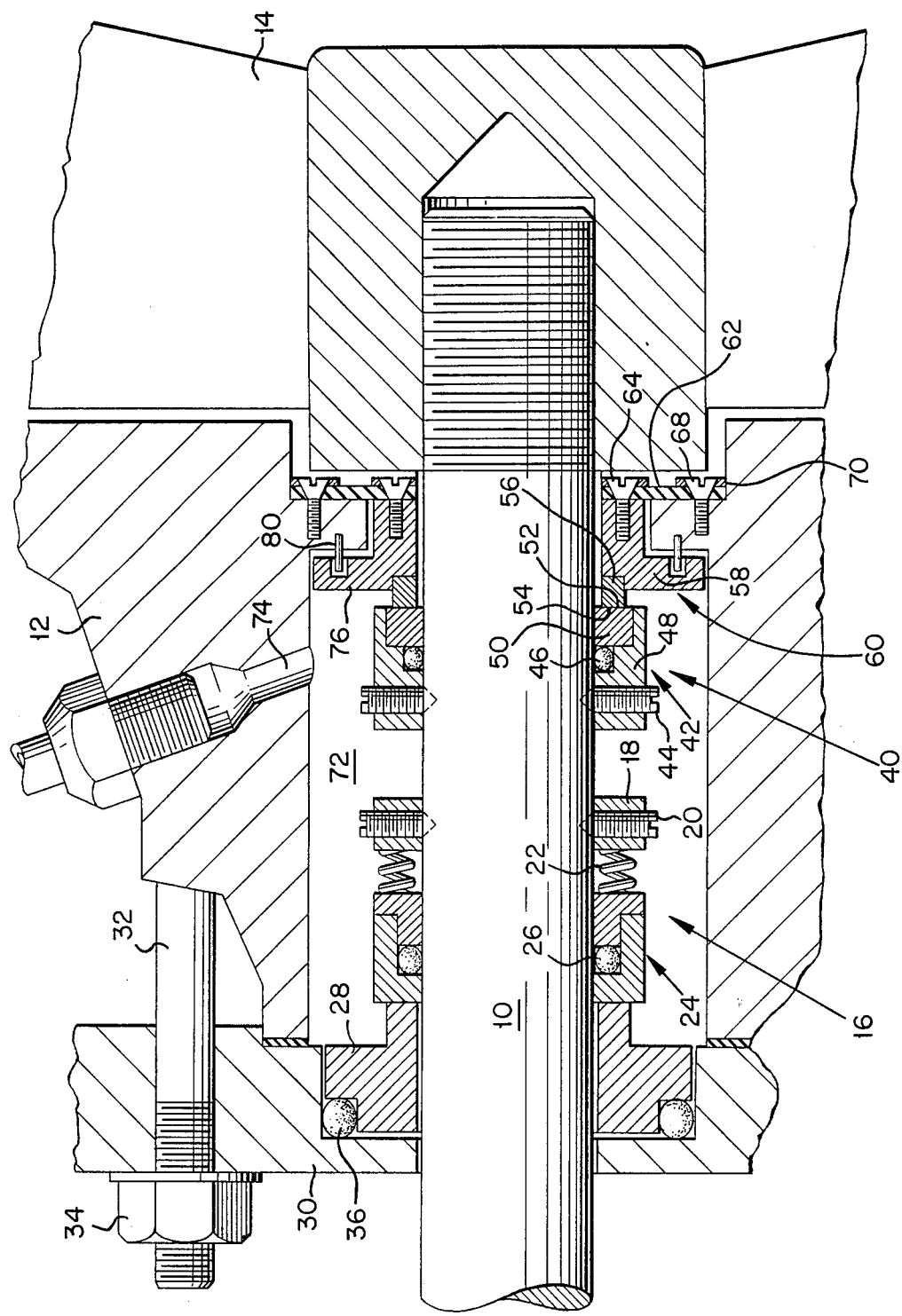

SEAL PROTECTION APPARATUS

BACKGROUND OF THE INVENTION

This invention relates to a pump seal protection apparatus. The invention finds particular application in the protection of a mechanical seal for a pump which is used to pump difficult liqids, such as slurries. The invention is not however limited to this kind of application.

A conventional mechanical seal for a pump is constituted by relatively rotating seal rings on the shaft and casing which are spring-loaded into sealing contact with one another. High pressure service water is used to isolate the rings from the pumped liquid. If, for some reason, the service water supply should fail, the pumped liquid is able to gain access to the seal rings. If the pumped liquid is abrasive slurry, the sealing surfaces can be scoured with the result that all sealing efficiency is lost and the pumped liquid can get to the motor bearings with disastrous consequences.

The object of the present invention is to provide a protection apparatus for the mechanical seal.

SUMMARY OF THE INVENTION

According to the present invention there is provided a seal protection apparatus for protecting a mechanical seal which establishes a seal between a rotating shaft of the pump and a pump casing through which the shaft passes, the protection apparatus comprising a first seal ring fast on the shaft and having a first sealing face, a second, floating seal ring having a second sealing face opposing the first sealing face, and a flexible annular diaphragm which is exposed on side thereof to pumped product inside the pump casing, which connects the second seal ring to the pump casing and which permits limited axial movement of the second seal ring towards and away from the first seal ring, the combination of seal rings and diaphragm defining one end of a service liquid compartment whose other end is defined by the mechanical seal which is to be protected, whereby pressurised service liquid which is introduced into the compartment acts on the second seal to force the sealing faces apart from one another to allow leakage of service liquid into the pump casing, thereby denying the pumped product access to the mechanical seal, and whereby if service liquid flow into the compartment should fail, the pumped product acts on the diaphragm to force the sealing faces together to create a seal denying the pumped product access to the mechanical seal.

In a preferred form of the invention, the sealing faces are provided by hard metal inserts connected to steel backing members. It is also preferred that the apparatus include means for preventing rotation of the diaphragm when the sealing faces are forced together. This can be achieved by one or more pins locating in apertures in the casing and in the second seal ring.

BRIEF DESCRIPTION OF THE DRAWINGS

The invention will now be described in more detail, by way of example only, with reference to the accompanying drawing which illustrates one embodiment of protection apparatus.

DESCRIPTION OF A PREFERRED EMBODIMENT

In the drawing, a shaft 10 passes through a pump casing 12 and carries an impeller 14 at its end inside the casing. A conventional arrangement of bearings and motor is provided at the opposite end of the shaft. The shaft is sealed with respect to the casing 12 by means of a conventional mechanical seal designated generally with the numeral 16.

The mechanical seal 16 has an annular body 18 which is connected fast to the shaft 10 by means of grub screws 20. Compression springs 22 act between the annular body 18 and an annular seal ring 24 which is grooved to take an 0-ring 26 sealing against the shaft 10. Another annular seal ring 28 is carried by a plate 30 which is connected to the casing by means of studs 32 projecting from the casing, and nuts 34. An O-ring 36 provides a seal between the seal ring 28 and the plate 30.

As thus far described, the apparatus is conventional. The springs 22 urge the sealing faces of the seal ring 24, which rotates with the shaft, and the seal ring 28, which is stationary, together. The seal established by the seal rings 24 and 28, in combination with the O-rings 26 and 36, prevents high pressure pumped product in the casing 12 from leaking along the shaft to the bearings of the driving motor.

While a simple mechanical seal of the kind described above may operate reasonably well with clear, non-corrosive pumped products, it is not satisfactory for use with abrasive slurries and some corrosive products. This is because the pumped product, if it is able to reach the sealing faces of the rings 24 and 28, can scour or corrode those faces with resultant loss of sealing efficiency.

It is for this reason that the invention provides the protection apparatus designated generally with the numeral 40. The apparatus includes a first seal ring 42 which is fast with the shaft by virtue of grub screws 44 and which is sealed with respect to the shaft by means of an 0-ring 46. The seal ring 42 is composed of a stainless steel backing member 48 and a tungsten carbide insert 50 brazed or otherwise fixed to the backing member. The insert 50 provides a sealing face 52. Opposing the sealing face 52 is the sealing face 54 of a tungsten carbide insert 56 fixed to a stainless steel backing member 58. The backing member 58 and its insert 56 constitute a second, floating seal ring 60 to one end of which the radially inner extremity of a flexible, annular rubber diaphragm 62 is fastened by means of cap screws 64 and washers 66. The radially outer extremity of the diaphragm 62 is fastened by means of cap screws 68 and washers 70 to the pump casing 12. Thus the seal ring 60 is capable of limited axial movement but cannot rotate.

The combination of seal rings 42 and 60 and diaphragm 62 forms one end of a service liquid compartment 72 which has an inlet 74. The mechanical seal 16 forms the opposite end of the compartment 72. A nipple at the end of a high pressure water hose is connected to the inlet 74. Clean service water at a pressure about 200kPa higher than the pressure inside the pump casing 12 is pumped into the compartment 72 during normal operation of the apparatus.

The pressurised service water acts on the face 76 of the seal ring 60 and urges it to the right in the drawing, thereby separating the faces 52 and 54. Service water is therefore able to leak between the faces 52 and 54 into the pump casing. Because it is at a pressure higher than that of the pumped product in the casing 12, it prevents that product from entering the compartment 72 and gaining access to the mechanical seal 16.

If, for some reason, the flow of service liquid to the compartment 72 should fail, either by stopping completely or by reducing pressure, the pressure in the compartment 72 will drop as leakage continues to take place. Eventually the situation is reached where the pressure of the pump product in the casing 12 is sufficient to act on the exposed side of the diaphragm 62 to force the seal ring 60 back to the left in the drawing. The relatively rotating sealing faces 52 and 54 contact one another in sealing relationship. Of course, this movement of the seal ring 60 is assisted by the natural resilience of the diaphragm 62. Once again, the pumped product is denied access to the service liquid compartment and the seal 16.

When the relatively rotating sealing faces 52 and 54 first come together on failure of the service liquid supply, the danger exists that the friction between these faces will result in a sudden twisting movement of the diaphragm 62, and possible tearing thereof. In the present case, this possibility is prevented by the provision of rigid steel pins 80 which locate in registering apertures in the casing 12 and in the seal ring 60. It will be seen that the apertures in the ring 60 are oversize which respect to the pin, so that limited movement only of the pins will be allowed.

An advantage of the invention is seen as residing in the fact that the protection apparatus provides protection for the main mechanical seal irrespective of whether the service liquid supply is operational.

I claim:

1. A seal protection apparatus for protecting a mechanical seal which establishes a seal between a rotating shaft of a pump and a pump casing through which the shaft passes, the protection apparatus arranged to protect said mechanical seal from product pumped by said pump, and comprising:

a first seal ring fixed on the shaft and having a first sealing face;

a second floating seal ring having a second sealing face opposing the first sealing face;

a flexible annular diaphragm surrounding the shaft and being connected to the second seal ring and to the pump casing in a manner permitting a limited degree of movement of the second sealing face toward and away from the first sealing face;

the combination of the first and second seal rings and diaphragm defining one end of a service liquid compartment of which the other end is defined by the mechanical seal to be protected, the one end of the service liquid compartment being constructed such that the service liquid compartment is communicated with product being pumped when the second sealing face is out of sealing engagement with the first sealing face;

the diaphragm having oppositely directed first and second sides, the first side being arranged to be acted upon by pressure in the service liquid compartment so as to tend to urge the second sealing face away from the first sealing face, and the second side being arranged to be acted upon by the pressure of product being pumped so as to tend to urge the second sealing face toward the first sealing face; and means for conducting pressurized service liquid into the service liquid compartment at or above a predetermined pressure level sufficient for urging the diaphragm in a direction moving the second sealing face out of sealing engagement with the first sealing face in opposition to the pressure of product being pumped to permit an outflow of service liquid into the product being pumped, the second sealing face being urged into sealing engagement with the first sealing face by the diaphragm and by the pressure of product being pumped in response to a pressure drop in the service liquid compartment below the predetermined level.

2. Seal protection apparatus according to claim 1, wherein the sealing faces are provided by hard metal inserts connected to steel backing members.

3. A seal protection apparatus according to claim 1, wherein means are provided to prevent rotation of the diaphragm when the sealing faces are forced together.

4. A seal protection apparatus according to claim 3, wherein the rotation preventing means comprises one or more pins locating in apertures in the pump casing and in the second seal ring.

* * * * *